(12) United States Patent
Haan et al.

(10) Patent No.: US 7,128,197 B2
(45) Date of Patent: Oct. 31, 2006

(54) HIGH VOLUME CONVEYOR SORTATION SYSTEM

(75) Inventors: Ted W. Haan, Wyoming, MI (US); Clinton R. Lupton, Grand Rapids, MI (US); Michael J. Kasper, Jenison, MI (US); Jerry J. Bukoski, Alto, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/160,078

(22) Filed: Jun. 8, 2005

(65) Prior Publication Data

US 2005/0217972 A1    Oct. 6, 2005

Related U.S. Application Data

(63) Continuation of application No. 10/065,789, filed on Nov. 19, 2002, now Pat. No. 6,923,307.

(60) Provisional application No. 60/332,439, filed on Nov. 21, 2001.

(51) Int. Cl.
*B65G 1/00*    (2006.01)

(52) U.S. Cl. ............... 198/347.4; 198/358; 198/419.2; 198/418.5

(58) Field of Classification Search ............ 198/347.4, 198/358, 419.2, 419.3, 419.5, 781.05, 781.06
See application file for complete search history.

(56) References Cited

U.S. PATENT DOCUMENTS

| | | | |
|---|---|---|---|
| 3,011,621 A | 12/1961 | Byrnes et al. | 198/349 |
| 3,620,349 A | 11/1971 | McCombie | 198/78 |
| 3,752,311 A | 8/1973 | Kobusch et al. | 209/72 |
| 3,799,319 A | 3/1974 | Cutler et al. | 198/29 |
| 3,995,735 A | 12/1976 | Risley | 198/425 |
| 4,383,605 A | 5/1983 | Harwick | 198/781 |
| 5,267,638 A | 12/1993 | Doane | 198/357 |
| 5,411,131 A | 5/1995 | Haegele | 198/572 |
| 5,638,938 A | 6/1997 | Lazzarotti et al. | 198/445 |
| 5,862,907 A | 1/1999 | Taylor | 198/781.05 |
| 5,893,701 A | 4/1999 | Pruett | 414/798.2 |
| 6,131,372 A | 10/2000 | Pruett | 53/448 |
| 6,540,063 B1 | 4/2003 | Fallas et al. | 198/461.1 |
| 6,629,593 B1 | 10/2003 | Zeitler | 198/460.1 |
| 6,638,062 B1 | 10/2003 | Davidson | 432/225 |
| 2003/0094347 A1 | 5/2003 | Haan et al. | 198/419.1 |
| 2004/0065526 A1 | 4/2004 | Zeitler | 198/460.1 |
| 2004/0112713 A1 | 6/2004 | Haan et al. | 198/419.2 |

FOREIGN PATENT DOCUMENTS

| | | |
|---|---|---|
| EP | 0484098 A1 | 5/1992 |
| WO | WO 9709256 | 3/1997 |
| WO | WO 9941169 | 8/1999 |
| WO | WO 0185582 A1 | 11/2001 |

*Primary Examiner*—Gene O. Crawford
*Assistant Examiner*—Rashmi Sharma
(74) *Attorney, Agent, or Firm*—Van Dyke, Gardner, Linn & Burkhart, LLP

(57) ABSTRACT

A sortation system and method includes providing a sorter assembly and a slug-building assembly. Product is received by the sorter assembly and sorted to a series of sortation lanes. The slug-building assembly includes a plurality of supply lines supplying product for sorting by the sorter assembly. At least one of the supply lines includes an accumulation conveyor and a slug conveyor. Product is accumulated in slug portions at the accumulation conveyor. Slug portions are combined into product slugs at the slug conveyor. Product slugs are discharged from the slug conveyor for sorting by the sorter assembly.

43 Claims, 7 Drawing Sheets

HIGH VOLUME CONVEYOR SORTATION SYSTEM

CROSS REFERENCE TO RELATED APPLICATIONS

This application is a continuation of patent application Ser. No. 10/065,789, filed on Nov. 19, 2002, which claims priority from provisional patent application Ser. No. 60/332,439, filed on Nov. 21, 2001, the disclosures of which are hereby incorporated herein by reference in their entirety.

BACKGROUND OF THE INVENTION

The present invention relates to conveyor sortation systems and, in particular, to an induct supply system for supplying product to a sorter assembly.

High-speed sorters, such as of the type disclosed in commonly assigned U.S. Pat. No. 5,127,510 and published International Application WO 02/26602 A2, published Apr. 4, 2002, are capable of sorting product, such as containers, and the like, at high rates of speed, such as 200 and even 300 16-inch cartons per minute. At that rate, it becomes a challenge to supply cartons to the sorter at a sufficiently high rate and properly gapped in order to be sorted. If product is not supplied to the sorter at a sufficiently high rate, the theoretical throughput of the system may not be realized.

Several induction systems are known in the art. Examples include those described in commonly assigned U.S. Pat. Nos. 5,038,911 and 5,267,638. Such induction systems are effective, but concentrate the merging and gapping of the cartons at the point immediately upstream of the sorter. Moreover, variation in product flow rate is accommodated by accumulation conveyors in each line upstream of the merge. Accumulation conveyors have difficulty handling product at a speed, or rate, that is high enough to keep the sorter assembly from becoming starved for product. If the speed of the accumulation conveyors is increased, it may reach a point where the handling of product in an organized single file becomes difficult.

SUMMARY OF THE INVENTION

The present invention is directed to an induction system which is capable of releasing product to a sorter assembly at a consistently high rate that matches performance of the sorter assembly in a manner which maximizes throughput of the system.

A sortation system and method, according to an aspect of the invention, includes providing a sorter assembly and a slug-building assembly. The sorter assembly receives product and sorts that product to a series of sortation lines. The slug-building assembly includes a plurality of supply lines supplying product to the induct. At least one of the supply lines includes an accumulation conveyor and a slug conveyor. The accumulation conveyor accumulates product in slug portions that are made up of a plurality of product. The slug conveyor combines slug portions into product slugs. The product slugs are discharged from the slug conveyor for sorting by the sorter assembly.

A sortation system and method, according to another aspect of the invention, includes providing a sorter assembly and sorting product to a series of sortation systems with the sorter assembly. The method further includes providing a slug-building assembly and building product slugs with the slug-building assembly for sorting by the sortation assembly. A control is provided for determining a sorter time parameter indicative of the rate of product being sorted and controlling the slug-building assembly at least as a function of the sorter time parameter. In this manner, the rate of product released by the slug-building assembly may be matched with the rate of sortation of product at the sorter assembly.

A sortation system and method, according to another aspect of the invention, includes providing a sorter assembly and an induct supplying product to the sorter assembly with controlled gap between the product and at least one supply line supplying product to the induct. The at least one supply line includes a conveying surface and an accumulation conveyor. Slugs of product are built on the at least one conveying surface by accumulating product on the accumulation conveyor and receiving product on the conveying surface from the accumulation conveyor. Products are received on the at least one conveying surface from the accumulation conveyor at a first substantially continuous speed to build slug and discharge from the at least one conveying surface at a second speed that is substantially higher than the first speed.

A sortation system and method, according to yet another aspect of the invention, includes providing a sorter assembly and a slug-building assembly made up of a plurality of supply lines supplying product for sorting by the sorter assembly. The at least one supply line includes an accumulation conveyor and a slug conveyor. The products are accumulated in slug portions made up of a plurality of product with the accumulation conveyor. Slug portions are combined into product slugs with the slug conveyor. The accumulation conveyor and slug conveyor operate at a substantially common continuous speed to build product slugs by combining slug portions. The slug conveyor operates at another substantially continuous speed that is higher than said continuous speed in order to discharge slugs of product.

These and other objects, advantages and features of this invention will become apparent upon review of the following specification in conjunction with the drawings.

DESCRIPTION OF THE PREFERRED EMBODIMENT

Figure 1:
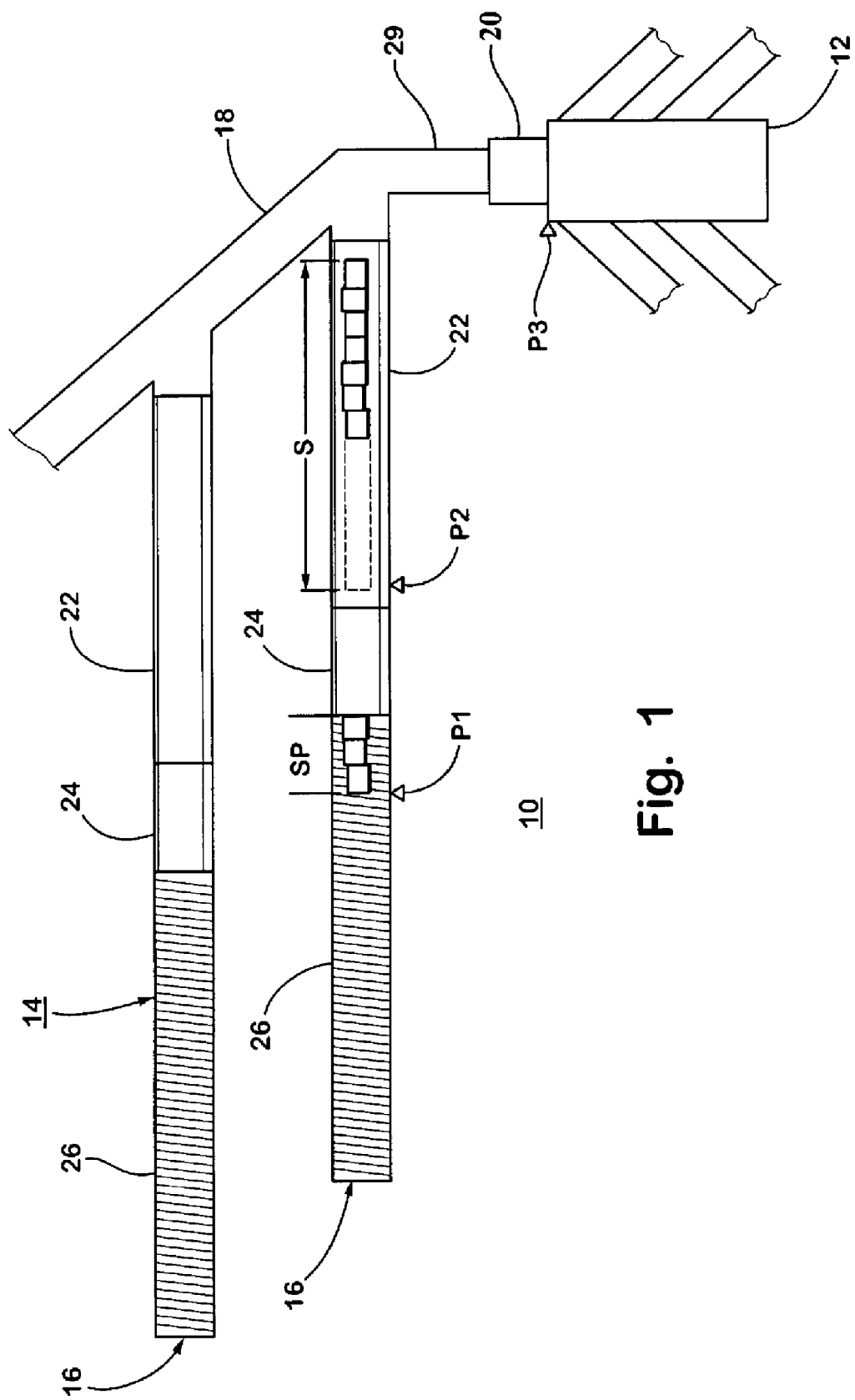
FIG. 1 is a top plan view of a block diagram layout of a sortation system, according to the invention.
Figure 2:
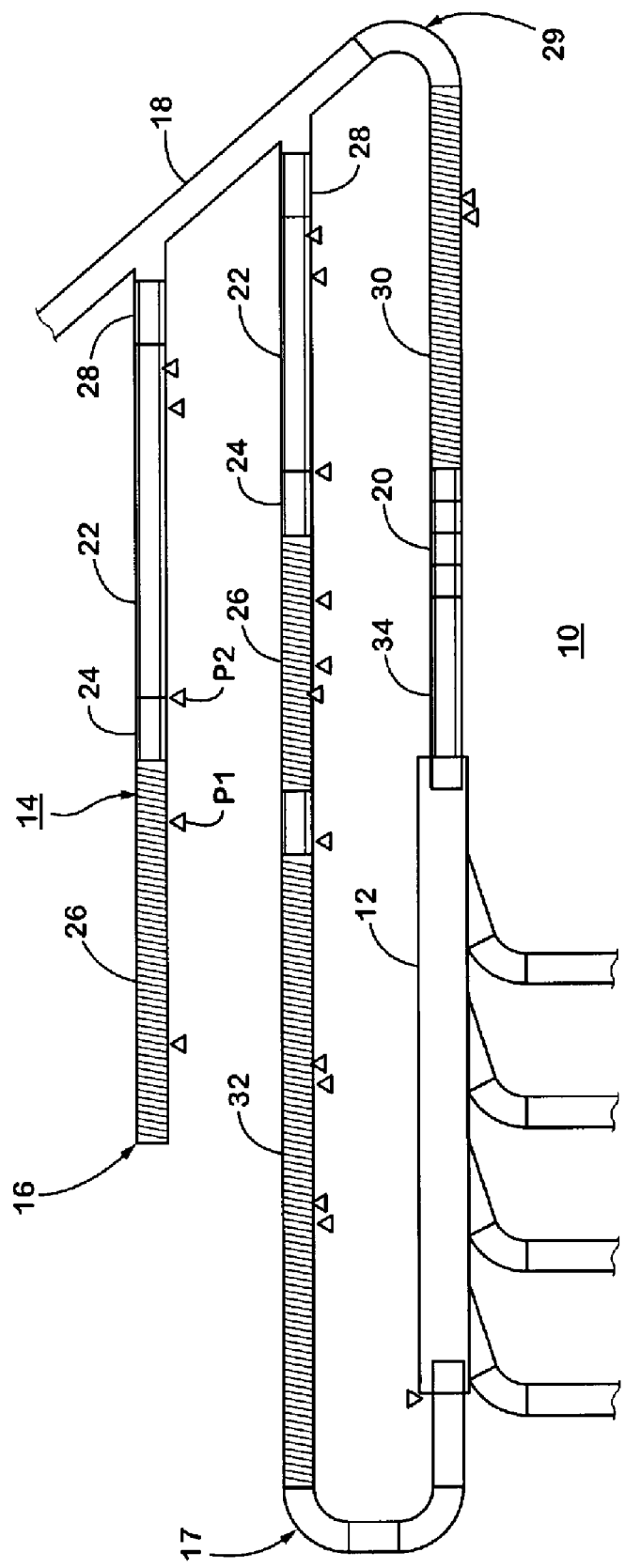
FIG. 2 is a top plan view in more detail of the sortation system of FIG. 1.

Referring now specifically to the drawings, and the illustrative embodiments depicted therein, a sortation system 10 includes a sorter assembly 12 and a slug-building assembly 14 (FIG. 1). Slug-building assembly 14 includes one or more supply lines 16. Sortation system 10 may further include a merge 18 for combining product from supply lines 16 in a single file and an induct 20. Merge 18 provides product from supply lines 16 to induct 20, which supplies the product to sorter assembly 12 with controlled gaps between the product. In the illustrative embodiment, sorter assembly 12 may be a linear sorter of the type disclosed in commonly assigned U.S. Pat. Nos. 5,127,510; 5,165,515; 6,041,909; and an international application published Apr. 4, 2002, as Publication No. WO 02/26602 A2, the disclosures of which is hereby incorporated herein by reference. However, sorter assembly 12 may be another type of linear sorter, such as a belt transfer, pop-up wheel, steered wheel, stationary pusher, or the like. Also, sorter assembly 12 may be a non-linear sorter, such as a carousel sorter. Examples of carousel sorters are cross-belt sorters of the type disclosed in commonly assigned U.S. Pat. Nos. 5,588,520 and 6,478,138, the disclosures of which are hereby incorporated herein by reference, as well as tilt-tray sorters, and the like. Induct 20 is illustrated as a single-line induct, such as the type disclosed in commonly assigned U.S. Pat. No. 5,341,916; commonly assigned U.S. patent application Ser. No. 09/669,170, filed Sep. 25, 2000, by Affaticati et al. for a HIGH RATE INDUCTION SYSTEM, and commonly assigned U.S. patent application Ser. No. 09/851,021 filed May 8, 2001, by Zeitler entitled CONVEYOR INDUCTION SYSTEM, the disclosures of which are hereby incorporated herein by reference. Other known gap optimizers or single-line inducts may also be used. However, induct 20 could also be a multiple-line induct of the type disclosed in commonly assigned U.S. Pat. Nos. 5,038,918 and 5,267,638, the disclosures of which are hereby incorporated herein by reference. In such configuration, the function of merge 18 may be divided into separate merges each feeding a line of the induct, or each supply line of the slug-building assembly may directly feed a line of the multiple-line induct, obviating the requirement for a merge.

A typical supply line 16 includes a conveying surface 22, or slug conveyor, which, in FIG. 1, is illustrated as a belt conveyor. Supply line 16 further includes an accumulation conveyor 26 upstream of the slug conveyor. A hold-back device, illustrated in FIG. 1 as a brake belt 24 upstream of the conveying surface 22, holds back product slug portions SP on accumulation conveyor 26 and facilitates the transfer of slug portions SP to slug conveyor 22 where they are combined in a slug S. Product is supplied to accumulation conveyor 26 from upstream processes, such as delivery docks or as recycling from sorter 12, or the like. Each supply line 26 may further include a discharge belt 28 for discharging slugs S from the slug conveyor.

In operation, sortation system 10 is positioned in a facility, which may be a warehouse freight terminal, or the like. Product is introduced into sortation system 10 from various inputs throughout the facility which send product to the sorter system. The product first arrives to accumulation conveyor 26, which, in the illustrative embodiment, is running at 210 feet per minute (fpm). This is a very manageable speed and should cause little or no product dynamic problems, such as side-by-side containers, pushing containers off of the conveyor, spinning containers, or the like. Product is accumulated on accumulation conveyor 26 when brake belt 24 is not operating. Brake belt 24, in the illustrative embodiment, is a 6-foot belt conveyor that holds the product back until the product has accumulated to a predetermined length, which, in the illustrative embodiment, is 12 feet. This defines a slug portion SP. Product is accumulated in a slug portion until a sensor, such as a photo-eye P1, is blocked. The brake belt then turns at a given substantially continuous speed, which, in the illustrated embodiment, is 190 fpm, and discharges the product to slug conveyor 22, which is also running substantially continuously at 110 fpm. As the product arrives at the slug conveyor, a sensor, such as photo-eye P2, at the beginning of the slug conveyor is blocked by the oncoming product and turns on the slug conveyor unit. This allows the 12 feet of product to be received on the charge end of the slug conveyor at a substantially continuous speed as a slug. As the photo-eye P2 becomes unblocked at the end of the 12 feet of product, the slug belt unit will stop. This process of combining 12-foot slug portions is repeated until the slug belt is filled thereby building a slug S of product, which, in the illustrative embodiment, is a 60-foot slug. This operation allows the building of a 60-foot slug of product at a speed of only 190 fpm with substantially no line pressure or product concerns and substantially no gaps between the product. More particularly, while small gaps may exist between product, the product may be packed in slug S back-to-back in contact with each other. However, slug conveyor 22 is able to handle the slug of product with little or no product line pressure. Therefore, the slug may be processed further without concern for side-by-side, rotated or, otherwise, mishandled product. It should be understood that reference to specific parameters, such as speeds, slug lengths, conveyor lengths, and the like, are for illustration purposes only and should not be interpreted as a limitation on the nature of the disclosure.

Once multiple slug portions SP are combined in a slug S on slug conveyor 22, slug S advances product to the end of the unit and is queued into a merge program for release to merge 18. When the release is available to the merge, slug conveyor 22 accelerates to a discharge speed that is substantially higher than the slug-building speed of 198 fpm. In the illustrative embodiment, the discharge speed is 378 fpm. Slug conveyor 22 accelerates to 378 fpm during an approximate one-second time interval and runs until all product is discharged. The acceleration/deceleration parameters of slug belt 22 may be selected to allow the product to be released at high speed without tipping or sliding of the product as the product is discharged from the slug conveyor unit.

Figure 3:
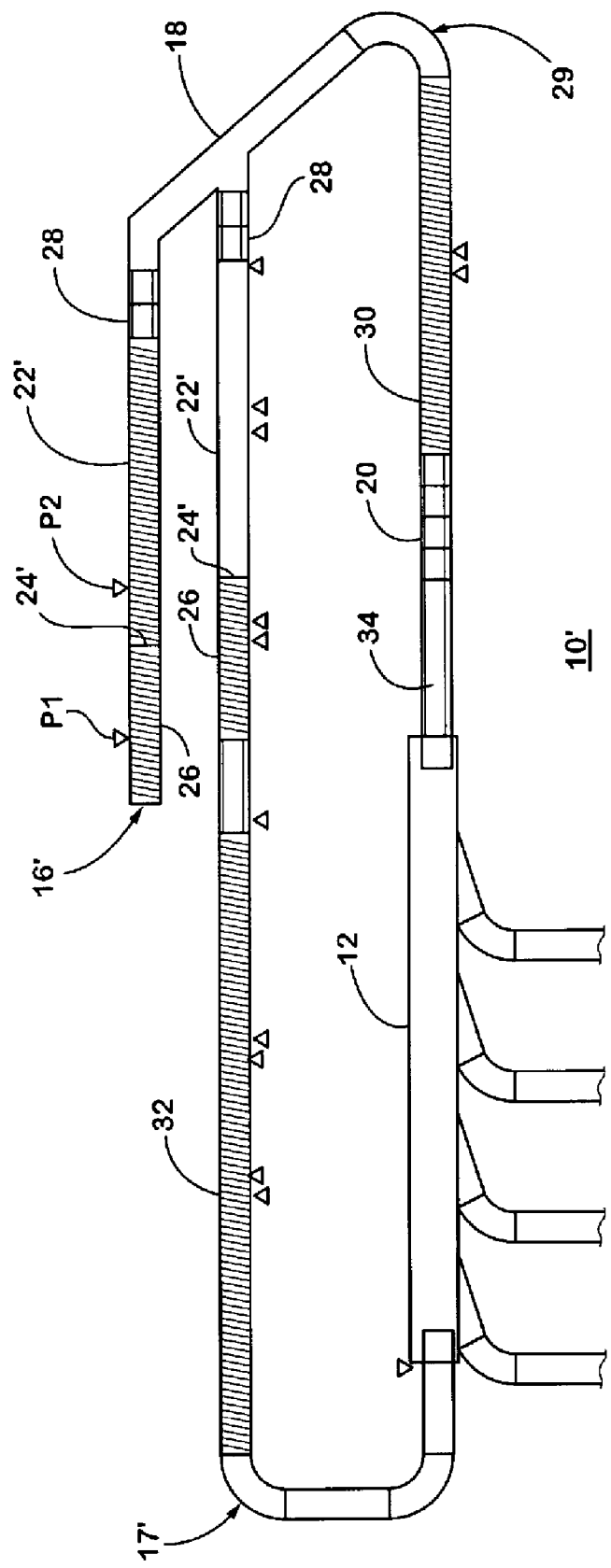
FIG. 3 is the same view as FIG. 2 of an alternative embodiment.

Product may be discharged from slug conveyor 22 through a discharge belt, or conveyor, 28, which operates at yet a higher speed than the discharge speed of slug conveyor 22 (FIG. 3). In the illustrative embodiment, discharge belt 28 operates at 454 fpm which produces a gap between product as the product is discharged from slug conveyor 22 to the merge. The discharge belt feeds directly to the merge, which, in the illustrative embodiment, is a series of live rollers. Such merge is well known in the art and, therefore, will not be described in detail. Suffice it to say that the configuration of the merge disclosed herein is illustrative only, other configurations may be used. The gaps drawn between product, as they speed up from the higher speed of slug belt 22 to the discharge belt 28, facilitates the rotation of the product as they enter merge 18 by allowing the product to rotate without contact as would be understood by the skilled artisan. Merge 18 may be a 45-degree merge, in which case, the merge is operated at 540 fpm. Merge 18 may be a 30-degree merge operating at speed of 522 fpm. From the merge, product is supplied to a transport conveyor 29 which may be operating at a speed that is slower than the speed of merge 18. This allows some of the gap introduced in the product stream to be removed from the product stream prior to entering the induct 20. Once the product is rotated at merge 18, it is no longer necessary for such a large gap to exist between product so the gap may be removed. Transport conveyor 29 may include a dynamic accumulation conveyor 30 to allow accumulation as needed without introducing additional gap between the product. Accumulation conveyor 30 may be of the type disclosed in commonly assigned U.S. Pat. Nos. 5,191,967 and 5,429,225, the disclosures of which are hereby incorporated herein by reference. From accumulation conveyor 30, product is provided to induct 20 for correction of gap between product and over a scan conveyor 34 where barcodes are scanned for determination of a destination of the product at sorter assembly 12.

In the illustrative embodiment, only two supply lines 16 are shown. The number of supply lines may vary according to the application, but is expected to nominally be six lanes or so. However, more or fewer lanes may be used. Also, as illustrated in FIG. 3, one supply line may be a recirculation line 17 from sorter assembly 12. The purpose of recirculation is to receive cartons that did not divert off of the sorter assembly and transport those cartons back to the slug-building assembly. In addition to an accumulation conveyor 26, brake belt 24, slug belt 22, and discharge belt 28, recirculation line 17 may include further accumulation buffer 32. The purpose of accumulation buffer 32 is to decelerate product from sortation speeds to transport speeds and transport the product to the slug-building assembly. Additionally, the accumulation buffer can accumulate surges of product that exceed the output rate of the accumulation buffer. Slug-building may proceed on recirculation line 17 in the same manner previously described. Sortation system 10 including recirculation line 17 may include an anti-gridlock mode as described in detail in commonly assigned U.S. patent application Ser. No. 09/669,170 filed Sep. 25, 2000, by Affaticati et al. for a HIGH RATE INDUCTION SYSTEM, the disclosure of which is hereby incorporated herein by reference.

The conveyors (22–28) used to implement slug-building assembly 14 may be operated with variable frequency driven motors where speed variations are required. However, they could also be operated with servo-driven motors.

Sorter system 10 includes a computer-based control (not shown) which receives inputs from the various product sensors, such as photo-eye P1, photo-eye P2, and the like, and provides outputs to operate the various conveyors as well as interface with a sorter control dedicated to operation of sorter assembly 12. Various control architectures may be utilized, such as the type disclosed in commonly assigned U.S. patent application Ser. No. 10/163,788, filed Jun. 6, 2002, by Zeitler et al. entitled TIERED CONTROL ARCHITECTURE FOR MATERIAL HANDLING, the disclosure of which is hereby incorporated herein by reference.

Figure 6:
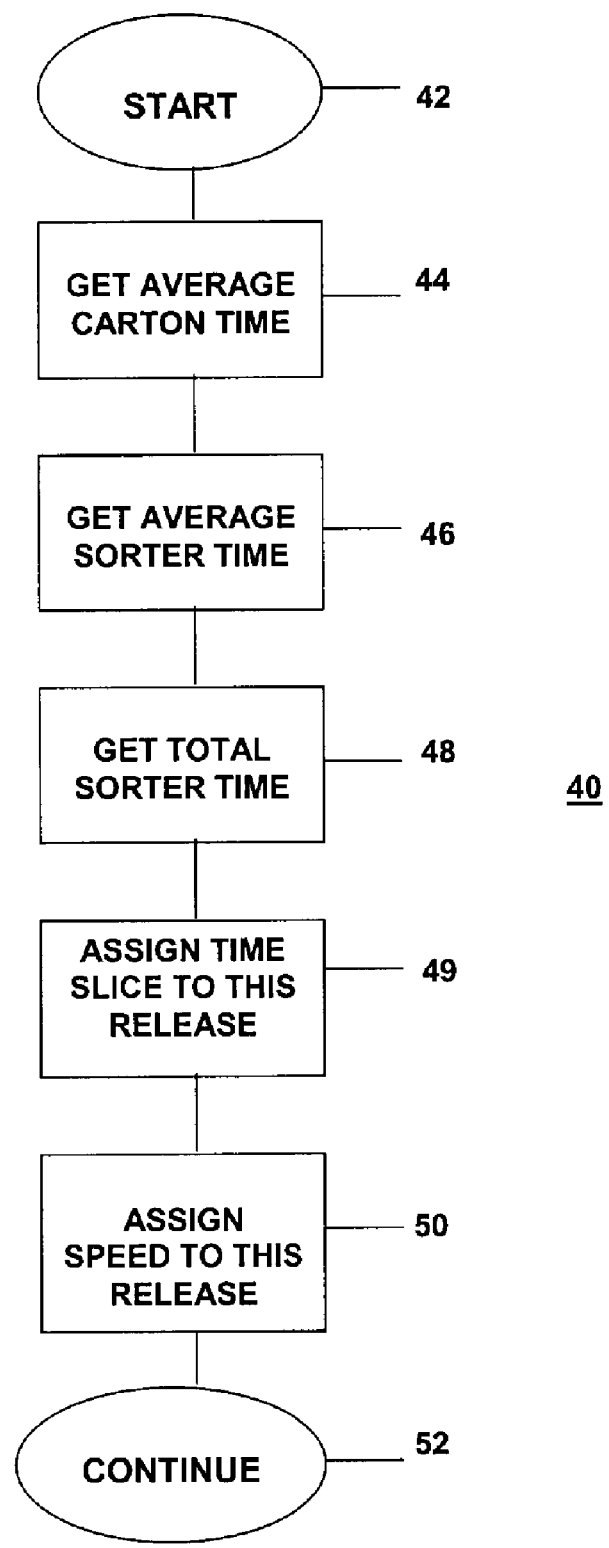
FIG. 6 is a flowchart of a control program, according to the invention.

Sortation system 10 may include a rate-matching control algorithm 40 (FIG. 6). Algorithm 40 begins at 42 by determining a sorter time parameter. This is accomplished by determining an AVERAGE CARTON TIME at 44. The AVERAGE CARTON TIME is determined by measuring the time that a photo-eye P1, P2, or P3 is blocked to obtain a TOTAL CARTON TIME and dividing the TOTAL CARTON TIME by the number of cartons to arrive at the AVERAGE CARTON TIME. If the AVERAGE CARTON TIME is less than a minimum time, the AVERAGE CARTON TIME is set to the minimum. An AVERAGE SORTER TIME is obtained at 46 from a relationship to the AVERAGE CARTON TIME, as may be obtained from a formula, look-up table, or the like. The AVERAGE SORTER TIME is multiplied by the carton count at 48 to obtain a TOTAL SORTER TIME at 48. From the TOTAL SORTER TIME, a time slice is obtained for a particular release at 49. The time slice is the interval in time in which that supply line 16 may release its product. Based upon the time slice assigned to that supply line, a release speed is determined at 50. The release speed is based upon the length of the product slug S on that supply line and is adjusted so that the release of that slug S may be accomplished within the determined time slice. If a smaller time slice is available for that supply line, the slug belt 22 is operated at a higher speed by providing suitable control commands to the frequency drive and/or servo drive motors operating the slug conveyor. Alternatively, if a larger time slice is assigned to that release for that supply line, the speed of the slug conveyor 22 may be decreased and still meet the assigned time slice. In this manner, only as many cartons are released to the merge as the sorter can process on average. While the calculation is illustrated as based upon time, the skilled artisan would understand that it could also be based upon length or rate.

In an alternative embodiment (FIG. 3), a sortation system 10' includes supply lines 16' including a conveying surface or slug conveyor 22' made up of a roller driven accumulator conveyor, such as of the type disclosed in commonly assigned U.S. Pat. Nos. 5,429,225 and 5,358,097, the disclosures of which are hereby incorporated herein by reference. Conveying surface 22' is capable of being operated at a low speed mode, such as 230 fpm in order to build slugs thereon in a way which does not cause side-by-sides, or the like. Once these slugs S are built on the accumulation conveying surface 22' the slugs S may be discharged at a higher rate of speeds, such as 398 fpm, without creating side-by-sides, or the like. Slugs are built on conveying surface 22' from a plurality of product slug portions PS assembled on an accumulation conveyor 26 behind a stop 24'. While the stop is raised, product is accumulated into a product slug portion until photo-eye P1 senses that a slug-portion is formed. Then, stop 24' is retracted and accumulation conveyor 26 is propelled at a generally constant speed that matches the low speed made of slug conveyor 22' to transfer the slug portion to the slug being formed on slug conveyor 22'. The stop 24' is an alternative to brake belt 24 in order to accomplish the same result. In other ways, the sortation system 10' is generally identical with sortation system 10.

Figure 4:
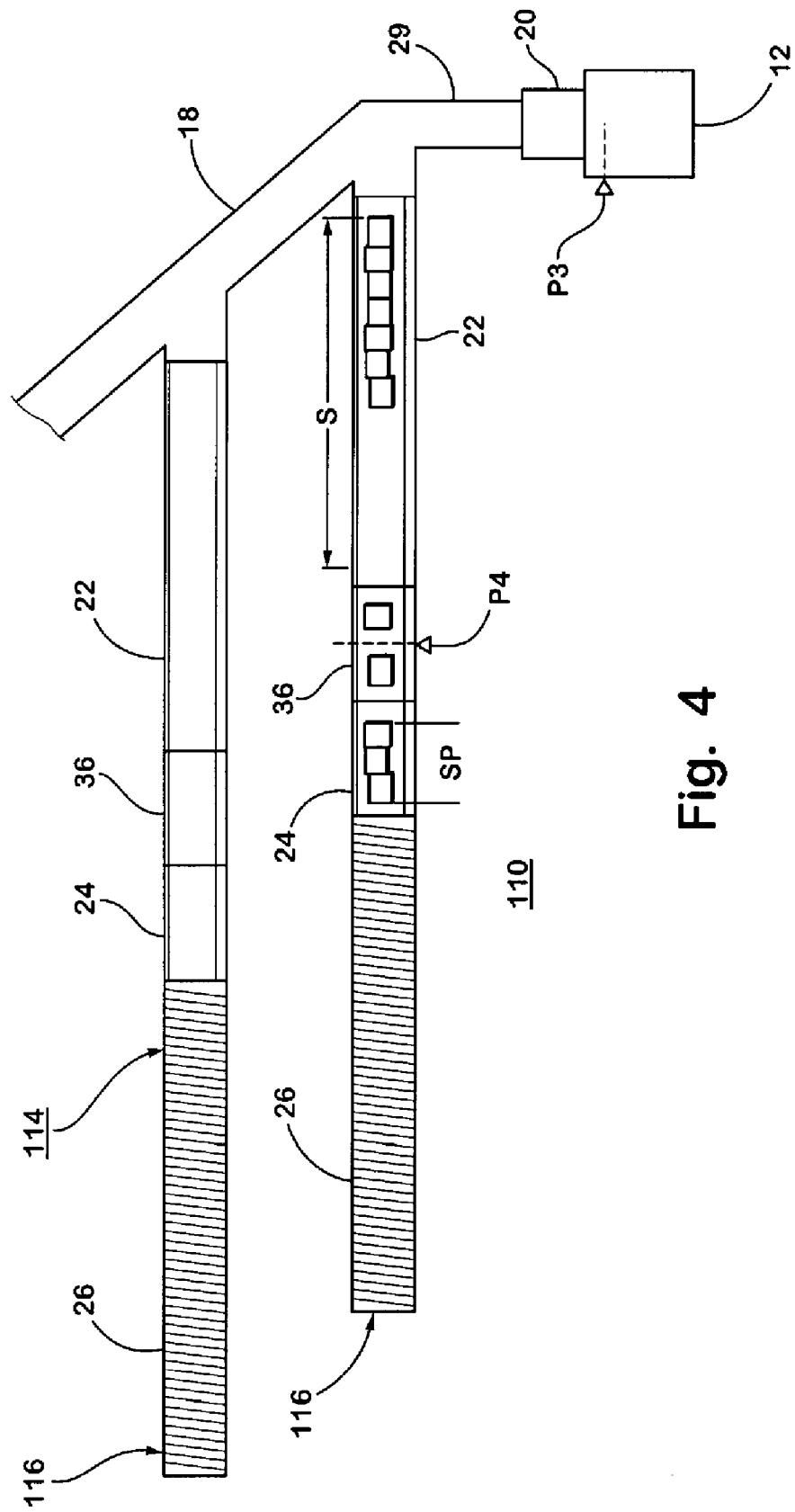
FIG. 4 is the same view as FIG. 1 of an alternative embodiment thereof.
Figure 5:
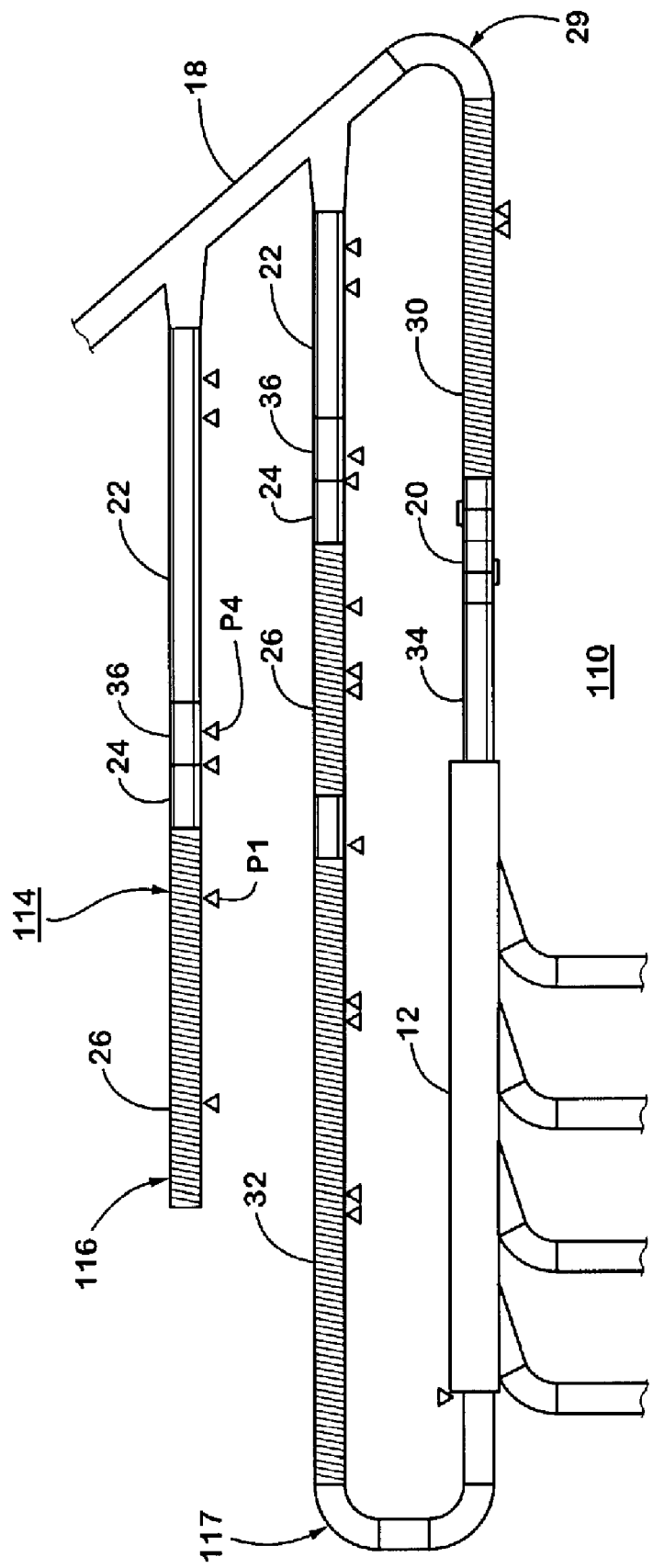
FIG. 5 is a top plan view in more detail of the sortation system of FIG. 4.
Figure 7:
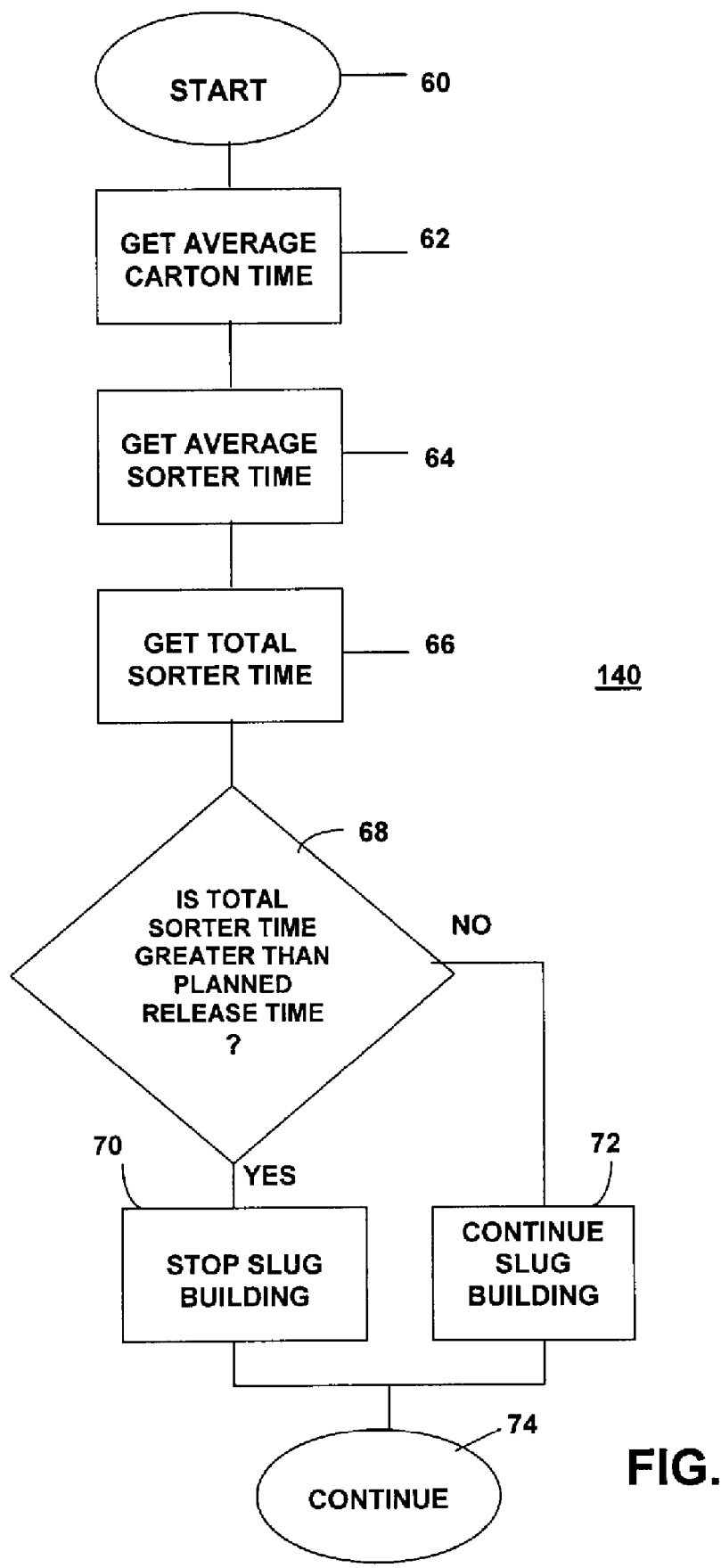
FIG. 7 is a flowchart of an alternative embodiment of a control program.

In another embodiment illustrated in FIGS. 4, 5 and 7, a sortation system 110 includes a slug-building assembly 114 including at least one supply line 116. As with the previous embodiments, supply line 116 includes an accumulation conveyor 26, a brake belt 24, and a slug conveyor 22. As with the previous embodiments, product is combined in slug portions SP on accumulation conveyor 26 while being held back, such as by brake belt 24 although a stop 24' could also be used. Once formed, the slug portions are conveyed to slug conveyor 22 where they are assembled into a slug S. As with the previous embodiments, sorter system 110 includes a merge assembly 18, an induct 20 and a sorter assembly 12.

Unlike prior embodiments, sortation system 110 includes a power-feed conveyor 36 between brake belt 24 and slug conveyor 22. Power-feed conveyor 36 is operated at a higher speed than brake belt 24, thereby drawing gap between product in the slug portion as the slug portion is transferred to the brake belt. This allows a sensor, such as a photo-eye P4, to scan each product in the slug portion in order to determine the length of each product in the direction and movement of the supply line 116. Because slug conveyor 22 is operated at the same general speed as accumulation conveyor 26 and brake belt 24, the decrease in speed from the power-feed conveyor to the slug conveyor will reduce the gap drawn between the product as it transfers onto the power-feed conveyor. Therefore, the result is a slug of product with little or no gap on the slug conveyor. However, the measurement of the length of each product allows the system control to be able to determine characteristics about the slug that is being formed on slug conveyor 22 for reasons that will now be set forth. Also, when the slug belt gets full, photo sensor P4 looks for a gap between the cartons and then stops. This clearly separates the back of the slug from the upstream carton.

Sortation system 110 includes a rate-matching control algorithm 140 which releases only as many cartons from the slug-building assembly as the sorter can process on average. Rate-matching control algorithm 140 functions by monitoring the size of each carton as it is formed into the slug. When the slug conveyor discharges, it may run for its normal release time before the next line starts. The merge releases only as many cartons per release as the sorter assembly can process. The control algorithm begins at 60 and determines at 62 an AVERAGE CARTON TIME of cartons making up slug S. This is accomplished by counting the number of cartons in the slug and measuring the TOTAL CARTON TIME in the slug. The TOTAL CARTON TIME is the amount of time that photo-eye P4 is blocked. The TOTAL CARTON TIME is divided by the number of cartons to obtain the AVERAGE CARTON TIME. If the AVERAGE CARTON TIME is less than a set minimum time, the AVERAGE CARTON TIME is set to the minimum. Algorithm 140 then gets the AVERAGE SORTER TIME at 64 by applying the AVERAGE CARTON TIME to a look-up table or formula in order to accommodate differences in speeds between the sorter assembly and the supply line. The AVERAGE SORTER TIME is multiplied by the carton count at 66 in order to obtain TOTAL SORTER TIME. TOTAL SORTER TIME is compared with a parameter PLANNED RELEASE TIME at 68. PLANNED RELEASE TIME is the amount of time required to discharge the slug S that has been developed at that time on the supply line 116.

If the TOTAL SORTER TIME is not greater than the PLANNED RELEASE TIME, the supply line continues at 72 to accumulate product in the slug S. If it is determined at 68 that the TOTAL SORTER TIME is greater than the PLANNED RELEASE TIME, slug building is discontinued at 70 and the slug is released at 74. Therefore, slug build rate matching measures cartons as they are built into the slug and makes the slug shorter than normal. However, advantageously, the slug is released by brake belt 24 at a constant speed. This reduces the necessity for a variable speed drive for slug conveyor 22, thereby reducing installed system cost. While the calculations are illustrated based on time, they also could be based upon length and/or rate.

The present invention builds slugs of product at a relatively low speed so that the cartons can be handled in a manner which does not mishandle the cartons, such as by causing side-by-sides, rotating the cartons, or, otherwise, causing the cartons to move out of single file. Once the slug is built on a belt conveyor, the slug can be discharged at a higher speed without concern for mishandling of the cartons. The goal of the present invention is to improve the overall throughput of the system as measured by system efficiency. System efficiency is in a measure of the ability of a system which merges product from multiple lines as compared with a system in which the product is supplied on a single line. It is estimated that the disclosed embodiments of the present invention are theoretically capable of achieving a 92 percent efficiency, which corresponds to the supply of 250 16-inch cartons per minute. This allows the sorter to operate at a higher speed without becoming starved for product.

Changes and modifications in the specifically described embodiments can be carried out without departing from the principles of the invention which is intended to be limited only by the scope of the appended claims, as interpreted according to the principles of patent law including the doctrine of equivalents.

What is claimed is:

1. A sortation system, comprising:
   a sorter assembly for receiving product and for sorting that product to a series of sortation lines;
   a slug-building assembly which builds product slugs on a conveying surface, wherein product slugs are discharged from said conveying surface and supplied for sortation by said sorter; and
   a control, wherein said control determines a rate of product being sorted by said sortation assembly and wherein said control affects operation of said slug-building assembly as a function of the rate of product being sorted by said sorter assembly, wherein said control generally matches the rate of product released by said slug-building assembly with the rate of sortation of product at said sorter assembly.

2. The sortation system of claim 1 wherein said control causes said slug-building assembly to discharge at least one product slug at a speed that is a function of the rate of product being sorted by said sorter assembly.

3. The sortation system of claim 1 including an induct providing controlled gap between the product supplied to said sorter assembly.

4. The sortation system of claim 3 including a transport conveyor between said slug-building assembly and said induct and wherein said control reduces a speed of said transport conveyor when said control reduces a speed of said induct.

5. The sortation system of claim 1 wherein said slug-building assembly comprises a plurality of supply lines supplying product to said induct, at least one of said supply lines including an accumulation conveyor and a slug conveyor, said accumulation conveyor accumulating product in slug-portions comprising a plurality of product, said slug conveyor combining slug-portions into product slugs.

6. The sortation system of claim 5 wherein said slug-building assembly restricts product in at least one product slug in response to the rate of product being sorted by said sorter assembly.

7. The sortation system of claim 5 wherein said slug-building assembly discharges product slugs at a speed that is a function of the rate of product being sorted by said sorter assembly.

8. A sortation system, comprising:
   a sorter assembly for receiving product and for sorting that product to a series of sortation lines;
   a slug-building assembly comprising a plurality of supply lines supplying product for sorting by said sorter assembly, at least one of said supply lines including an accumulation conveyor and a slug conveyor, said accumulation conveyor accumulating product in slug-portions comprising a plurality of product, said slug conveyor combining slug-portions into product slugs;
   wherein product slugs are discharged from said slug conveyor for sorting by said sorter assembly; and
   a computer-based control controlling said slug-building assembly, said control including a control algorithm for selecting a discharge speed at which product slugs are discharged from said slug conveyor as a function of the rate product is being sorted by said sorter assembly.

9. The sortation system of claim 8 including an impediment which has a first mode selectively holding back product on said accumulation conveyor thereby forming the slug-portions at said accumulation conveyor, said impediment having a second mode facilitating transfer of said slug-portions to said slug conveyor.

10. The sortation system of claim 9 wherein said impediment comprises at least one chosen from a brake belt and a product stop.

11. The sortation system of claim 8 including a power-feed conveyor drawing gap between products in slug-portions.

12. The sortation system of claim 11 wherein said power-feed conveyor substantially closes the gap between product in the slug-portions prior to inclusion of that slug-portion in a slug.

13. The sortation system of claim 11 including at least one product detector detecting at least one parameter of the product at said slug-building assembly.

14. The sortation system of claim 8 including at least one product detector detecting a rate of product being sorted by said sorter assembly, wherein said control selects said discharge speed in response to said at least one product detector.

15. The sortation system of claim 14 wherein said at least one product detector is positioned downstream of said slug-building assembly.

16. The sortation system of claim 8 including an induct providing controlled gap between the product supplied to said sorter assembly.

17. The sortation system of claim 16 including a transport conveyor between said slug-building assembly and said induct and wherein said control selects a speed of said transport conveyor when said control reduces a speed of said induct in response to an excessive product load.

18. The sortation system of claim 17 wherein said transport conveyor includes a dynamic accumulation conveyor.

19. The sortation system of claim 8 including at least one merge receiving product slugs discharged from said plurality of supply lines and combining the product slugs in a single file.

20. The sortation system of claim 8 wherein said slug conveyor comprises at least one belt conveyor.

21. The sortation system of claim 11 wherein said slug conveyor comprises another accumulation conveyor.

22. A method of sorting product, comprising:
providing a sorter assembly and sorting product to a series of sortation lines with said sorter assembly, and
providing a slug-building assembly and building product slugs with said slug-building assembly for sorting by said sorter assembly, including determining a rate of product being sorted by said sorter assembly, and controlling said slug-building assembly at least as a function of the rate of product being sorted by said sorter assembly, wherein the rate of product released by said sorter assembly is generally matched with the rate of sortation of product at said sorter assembly.

23. The method of claim 22 including discharging from said slug-building assembly at a speed that is a function of the rate of product being sorted by said sorter assembly.

24. The method of claim 22 including providing an induct and providing controlled gap between product supplied to said sorter assembly with said induct.

25. The method of claim 24 including providing a transport conveyor between said slug-building assembly and said induct and reducing a speed of said transport conveyor when the speed of said induct is reduced.

26. The method of claim 25 wherein said transport conveyor includes a dynamic accumulation conveyor.

27. The method of claim 22 wherein said slug-building assembly comprises a plurality of supply lines supplying product to said induct, at least one of said supply lines including an accumulation conveyor and a slug conveyor, said accumulation conveyor accumulating product in slug-portions comprising a plurality of product, said slug conveyor combining slug-portions into product slugs.

28. The method of claim 27 including restricting product in at least one product slug at said slug conveyor in response to increases of the rate of product being sorted by said sorter assembly.

29. The method of claim 27 including discharging product slugs at a speed that is a function of the rate of product being sorted by said sorter assembly.

30. A method of sorting product, comprising:
providing a sorter assembly and sorting product to a series of sortation lines with said sortation assembly;
providing a slug-building assembly comprising a plurality of supply lines supplying product for sorting by said sorter assembly, at least one of said supply lines including an accumulation conveyor and a slug conveyor;
accumulating product in slug portions comprising a plurality of product with said accumulation conveyor;
combining slug-portions into product slugs with said slug conveyor;
discharging product slugs from said slug conveyor and sorting the product of the discharged product slugs with said sortation assembly; and
controlling said slug-building assembly by selecting a discharge speed at which product slugs are discharged from said slug conveyor as a function of the rate product is being sorted by said sorter assembly.

31. The method of claim 30 including providing an impediment and selectively holding back product on said accumulating conveyor to form the slug-portions and selectively facilitating transfer of said product slug-portions from said accumulation conveyor to said slug conveyor.

32. The method of claim 31 wherein said impediment comprises at least one chosen from a brake belt and a product stop.

33. The method of claim 30 including providing a power-feed conveyor and drawing gap between products in the slug-portions with said power-feed conveyor.

34. The method of claim 33 including substantially closing the gap between product in the slug-portions with said power-feed conveyor prior to inclusion of that slug-portion in a slug.

35. The method of claim 33 including detecting at least one parameter of the product at said slug-building assembly.

36. The method of claim 30 including detecting a rate of product being sorted by said sortation assembly and selecting the discharge speed as a function of the rate of product being sorted.

37. The method of claim 36 including detecting the rate at a location downstream of said slug-building assembly.

38. The method of claim 30 including providing an induct and providing controlled gap between product supplied to said sorter assembly with said induct.

39. The method of claim 38 including providing a transport conveyor between said slug-building assembly and said induct and reducing a speed of said transport conveyor when a speed of said induct is reduced.

40. The method of claim 39 wherein said transport conveyor includes a dynamic accumulation conveyor.

41. The method of claim 39 including providing at least one merge receiving product slugs discharged from said plurality of supply lines and combining the product slugs in a single file.

42. The method of claim 30 wherein said slug conveyor comprises at least one belt conveyor.

43. The method of claim 30 wherein said slug conveyor comprises another accumulation conveyor.

* * * * *